United States Patent [19]
Takenaga et al.

[11] 3,904,755
[45] Sept. 9, 1975

[54] ANTIBIOTIC SOLUTION

[75] Inventors: Mitsuhiro Takenaga, Machida; Akira Okada, Kawasaki, both of Japan

[73] Assignee: Meiji Seika Kaisha, Ltd., Tokyo, Japan

[22] Filed: Dec. 28, 1971

[21] Appl. No.: 213,222

[30] Foreign Application Priority Data
Dec. 29, 1970 Japan.............................. 46-121887

[52] U.S. Cl. .............................................. 424/181
[51] Int. Cl.² ......................................... A61K 31/71
[58] Field of Search .................................... 424/181

[56] References Cited
UNITED STATES PATENTS
3,616,243  10/1971  Kawasaki et al..................... 195/80

OTHER PUBLICATIONS
Chemical Abstracts, 77: 130587x, (1972).
The Merck Index, 8th Ed., Merck & Co., Inc., Rahway, N.J., 1968, pp. 210, 359, 434, 435, 644, 876, 877 and 1072.
Chemical Abstracts, 63: 10049b, (1965).

*Primary Examiner*—Jerome D. Goldberg
*Attorney, Agent, or Firm*—Sughrue, Rothwell, Mion, Zinn and Macpeak

[57] ABSTRACT

An aqueous solution of a basic water-soluble antibiotic, stable to coloring and reduction in pH value is obtained by incorporating in the aqueous solution, a polyhydric alcohol selected from the group consisting of glycerin, propylene glycol, ethylene glycol, diethylene glycol, triethylene glycol, polyethylene glycol, and mannitol.

4 Claims, No Drawings

ANTIBIOTIC SOLUTION

BACKGROUND OF THE INVENTION

1. Field of the Invention

The present invention relates to a process for preparing a stable solution of a basic water-soluble antibiotic, or the additional salts thereof, such as sulfate, hydrochloride, nitrate, phosphate and acetate and the like, without being accompanied by discoloration.

2. Description of the Prior Art

Although the effect of a basic water-soluble antibiotic is not substantially varied when it is dissolved in water, it has a disadvantage in that an aqueous solution thereof, for example, for injection is gradually colored brown with the passage of time, which reduces the commercial value of the solution. For example, when a 1% aqueous solution of fradiomycin sulfate or streptomycin sulfate is stored for 1 month at 37°C., the solution is clearly colored and also when a 1% aqueous solution of kanamycin sulfate or aminodeoxykanamycin sulfate is stored for 2 months at 37°C., the solution is clearly colored.

Attempts for effectively preventing the occurrence of the color in such solutions have not yet been found. There is usually employed a method of storing the aqueous solution under an oxygen free condition by replacing the surrounding air with a nitrogen gas or placing the same in a closed glass vessel. However, in case of eye drops or syrups to which the means of the nitrogen gas replacement or placement in a closed glass vessel is hampered it is quite difficult to prepare a stable solution which can be stored for a long period of time without exhibiting discoloration.*

*The term discoloration pertains to the coloration of an aqueous solution of a water soluble antibiotic upon standing.

It has, therefore, been desirable to stabilize an aqueous solution of an antibiotic, such as eye drops, ear drops, nasal drops, syrups, or injections in such a manner as to prevent discoloration.

As a stabilizer for preventing the aqueous solution of an antibiotic from being colored during preservation thereof, a sulfite such as sodium sulfite, sodium bisulfite, and sodium metabisulfite is ordinarily used. However, as shown in Table 1, in which the coloring stability of a 1% aqueous solution of aminodeoxykanamycin sulfate is illustrated, the addition of such a sulfite compound in an amount of about 0.1% provides no color prevention effect to the solution. However, when about 1% of sodium bisulfite or sodium metabisulfite is added to the solution, a color prevention effect is observed.

However, the addition of such an effective amount of the sulfite reduces the pH of the aqueous solution with the passage of time as shown in Table 2, in which the variation of the pH of a 1% aqueous solution of aminodeoxykanamycin sulfate is illustrated.

For example, as shown in the above Table, the pH of the 1% aqueous solution of aminodeoxykanamycin sulfate directly after the addition of 1% $NaHSO_3$ was 5.5, but the pH was dramatically reduced to 2.20, 2.15, 2.10, and 1.96 upon storing for 2 months at 25°C., 2 months at 37°C., 2 months at 45°C., and one-half month at 60°C., respectively.

Thus, if the amount of the sulfite is increased for obtaining a coloring prevention effect, the pH of the aqueous solution is reduced to an undesirable extent. That is, for example, when applying an eye drop to the mucous membrane of the eye, it does not irritate the eye in a pH range of 4.5 to 9.0, but does irritate when the pH approaches a value outside of this range, as reported in the Eight Edition, Japan Pharmacopoeia, Section 1, Commentary, page A-110, published by the Hirokawa Book Co.

From the above points, the reduction of the pH of an aqueous solution of an antiobiotic is undesirable and further, because it is desirable to maintain the pH of ear drops, nasal drops, and injections around neutral, the Table 1

| | 10 mg./ml. As Aminodeoxykanamycin Free Base (450μmicrons optical density) | | | | |
|---|---|---|---|---|---|
| Additive | Initial | 2 months 25°C | 2 months 37°C | 2 months 45°C | ½ month 60°C |
| None (control) | 0.000 | 0.021 | 0.076 | 0.154 | 0.170 |
| $Na_2SO_3$ 0.1% | 0.010 | 0.024 | 0.070 | 0.160 | 0.172 |
| " 0.5% | 0.020 | 0.028 | 0.084 | 0.180 | 0.174 |
| " 1.0% | 0.054 | 0.074 | 0.196 | 0.182 | 0.188 |
| $NaHSO_3$ 0.1% | 0.020 | 0.032 | 0.072 | 0.174 | 0.170 |
| " 0.5% | 0.018 | 0.024 | 0.026 | 0.020 | 0.020 |
| " 1.0% | 0.016 | 0.024 | 0.028 | 0.024 | 0.032 |
| $Na_2S_2O_5$ 0.1% | 0.002 | 0.064 | 0.106 | 0.152 | 01.74 |
| " 0.5% | 0.008 | 0.012 | 0.024 | 0.024 | 0.030 |
| " 1.0% | 0.012 | 0.010 | 0.012 | 0.020 | 0.012 |

Table 2

| | 10 mg factor ml as Aminodeoxykanamycin Free Base | | | | |
|---|---|---|---|---|---|
| Additive | Initial | 2 months 25°C | 2 months 37°C | 2 months 45°C | ½ month 60°C |
| None (control) | 6.72 | 6.86 | 6.82 | 6.80 | 6.79 |
| $Na_2SO_3$ 0.1% | 6.70 | 5.82 | 5.72 | 5.93 | 5.82 |
| " 0.5% | 7.14 | 5.93 | 6.04 | 5.98 | 5.90 |
| " 1.0% | 7.13 | 5.21 | 5.02 | 5.28 | 5.37 |
| $NaHSO_3$ 0.1% | 6.19 | 6.08 | 6.09 | 6.01 | 6.21 |
| " 0.5% | 5.60 | 2.50 | 2.50 | 2.32 | 2.25 |
| " 1.0% | 5.52 | 2.20 | 2.15 | 2.10 | 1.96 |
| $Na_2S_2O_5$ 0.1% | 6.43 | 6.04 | 6.08 | 6.08 | 6.25 |
| " 0.5 | 5.43 | 2.32 | 2.36 | 2.28 | 2.30 |
| " 1.0% | 5.18 | 2.03 | 1.98 | 2.02 | 1.80 | reduction of the pH value of the solution must be prevented from this point.

Also, as illustrated in the following table, when the pH of an aqueous solution of a basic water-soluble antibiotic is reduced to the acid side, the antibacterial activity of the antibiotic is normally reduced and thus from this point, the reduction of the pH value is also undesirable.

Table 3

Dilution assay of aqueous solution of aminodeoxykanamycin sulfate

| pH | St. aureus (209p) | | E. coli (IAM 1253) | |
|---|---|---|---|---|
| | 24 hrs | 48 hrs. | 24 hrs. | 48 hrs. |
| 5.0 | 20.0 | 20.0 | 20.0 | 20.0 |
| 6.0 | 5.0 | 5.0 | 5.0 | 5.0 |
| 7.0 | 1.3 | 1.3 | 0.6 | 1.3 |
| | Unit: microns g/ml. | | Unit: microns g/ml. | |

Furthermore, a sulfite is liable to be oxidized and thus when the sulfite is incorporated in the aqueous solution of an antibiotic, the sulfite in the solution may be oxidized with the passage of time.

As mentioned above, the conventional method of employing the sulfite as a stabilizer for preventing the discoloration of an aqueous solution of a basic water-soluble antibiotic is accompanied with a reduction in the pH of the solution, which in turn, results in the reduction in the activity of the antibiotic. Therefore, the added amount of sulfite is limited to such a small amount that no reduction in pH of the solution is observed. This is usually less than about 0.5%, which gives an insufficient stabilization effect for preventing discoloration of the solution as reported in Yakkyoku (Journal of Practical Pharmacy); Vol. 21, page 477, 1970.

SUMMARY OF THE INVENTION

Therefore, as the results of various investigations, the inventors have discovered effective discoloration preventing agents different from the conventional type and have succeeded in, based on this discovery, producing a stable aqueous solution of a basic water-soluble antibiotic, which is not discolored (colored) with the passage of time.

That is, the inventors have discovered that a polyhydric alcohol selected from the group consisting of glycerin, propylene glycol, ethylene glycol, diethylene glycol, triethylene glycol, polyethylene glycol, and mannitol is quite effective for preventing the discoloration of an aqueous solution of a basic water-soluble antibiotic. In addition, an aqueous solution of such an antibiotic containing a hydrophilic alcohol as the coloring preventing agent can be stored for a long period of time without an attendant reduction in the pH value.

For example, after a 1% aqueous solution of aminodeoxykanamycin sulfate was incorporated with glycerin or propylene glycol in accordance with this invention, in an amount shown in the following table and stored for the period of time shown in the same table, the coloring state of the solution was observed. The results are shown in the following table together with a control case.

Table 4

| Additive | | Initial | 2 months 25°C. | 2 months 37°C. | 2 months 45°C. | ½ month 60°C. |
|---|---|---|---|---|---|---|
| None (control) | | 0.000 | 0.021 | 0.076 | 0.154 | 0.170 |
| Glycerin | 5% | 0.001 | 0.001 | 0.012 | 0.006 | 0.010 |
| " | 10% | 0.000 | 0.004 | 0.006 | 0.004 | 0.008 |
| " | 20% | 0.002 | 0.008 | 0.012 | 0.014 | 0.010 |
| Propylene glycol | 5% | 0.004 | 0.010 | 0.012 | 0.010 | 0.014 |
| " | 10% | 0.012 | 0.010 | 0.008 | 0.008 | 0.012 |
| " | 20% | 0.008 | 0.010 | 0.008 | 0.012 | 0.010 |

Also, the change in pH of the solution was observed and the results are shown in the following table:

Table 5

| Additive | | Initial 25°C. | 2 months 37°C. | 2 months 45°C. | 2 months 60°C. | ½ month |
|---|---|---|---|---|---|---|
| None (control) | | 6.70 | 6.62 | 6.70 | 6.62 | 6.79 |
| Glycerin | 5% | 7.08 | 6.62 | 6.70 | 6.70 | 6.80 |
| " | 10% | 6.90 | 6.61 | 6.70 | 6.70 | 6.56 |
| " | 20% | 6.82 | 6.65 | 6.70 | 6.62 | 6.59 |
| Propylene glycol | 5% | 6.90 | 6.70 | 6.70 | 6.70 | 6.62 |
| " | 10% | 6.68 | 6.55 | 6.74 | 6.60 | 6.82 |
| " | 20% | 6.90 | 6.61 | 6.65 | 6.68 | 6.80 |

As illustrated above, by incorporating glycerin or polypropylene in an aqueous solution of an antibiotic, such as aminodeoxykanamycin, the coloring of the aqueous solution can be effectively prevented and even if the aqueous solution of the antibiotic contains a considerably large amount of conventional stabilizer, the pH of the solution is scarcely reduced when the solution is stored for a long period of time.

The same effect as above is also obtained when employing ethylene glycol, diethylene glycol, triethylene glycol, polyethylene glycol, or mannitol.

DETAILED DESCRIPTION OF THE INVENTION

The mechanism by which such a polyhydric alcohol provides this excellent effect has not yet been determined; however, on considering the fact that when other polyhydric alcohols, other than those mentioned above, such as diethylene glycol monoethyl ether and sorbitol are employed as a stabilizer for an aqueous solution of a water soluble antibiotic, the effect attained, as above, is not obtained. This would indicate that the selection of the polyhydric alcohol is critical and the mechanism of action is specific.

Therefore, according to the present invention, an aqueous solution of a basic water-soluble antibiotic stable to coloring is obtained by incorporating a polyhydric alcohol selected from the group consisting of glycerin, propylene glycol, ethylene glycol, diethylene glycol, triethylene glycol, polyethylene glycol, and mannitol and in an aqueous solution of a gasic water-soluble antibiotic, such as fradiomycin, streptomycin, kanamycin, aminodeoxykanamycin, kasugamycin, gentamicin, paromomycin, or an acid-addition salt of such an antibiotic, e.g., a sulfate, a hydrochloride, a nitrate, a phosphate, or an acetate.

There is no particular limit as to the amount of the polyhydric alcohol employed in this invention; however, the amount normally employed ranges from 1–10%. The aqueous solution of the basic water-soluble antibiotic containing a small amount of the polyhydric alcohol according to the present invention can be stably stored for a long period of time without being accompanied by discoloration to a brown color or other color. In addition, a reduction in the pH thereof when the aforementioned solution is stored in a glass vessel having a proper stopper or in an air-tight closable synthetic resin vessel without the presence of nitrogen gas replacement or a glass closed vessel, such as a glass ampoule or vial is not observed.

By the inventors' experiments, a 1% aqueous solution of aminodeoxykanamycin sulfate containing 2% glycerin prepared by dissolving 1 g. of aminodeoxykanamycin and 2 g. of glycerin in water to form 100 ml. of the solution was placed in a synthetic resin vessel and preserved for 21 days at 60°C. Thereafter when the absorbance of the solution showing the colored extent of the solution was measured at 450 m.$\mu$., the absorbance was 0.014. On the other hand, when the absorbance was measured at 450 m.$\mu$. of a 1% aqueous solution of aminodeoxykanamycin not containing glycerin after storing the solution under the same conditions as above, the absorbance was 0.172. When the absorbance of the solution was 0.014 as in the case of adding glycerine thereto, the coloring of the solution was not observed by the naked eye, but when the absorbance of the solution was 0.172 as in the case of adding no glycerin, it was clearly observed that the solution was colored a yellow brown.

Moreover, according to the inventors' experiments, the pH of a 1% aqueous aminodeoxykanamycin sulfate solution containing sodium bisulfate prepared by dissolving 1 g. of aminodeoxykanamycin and 1 g. of sodium bisulfate in water to form 100 ml. of the solution was 5.5 immediately after the preparation thereof, but when the solution was preserved for one week at room temperature, the pH of the solution was reduced to 2.3. On the other hand, when the polyhydric alcohol of this invention was added to the aqueous solution according to the present invention in place of the sulfite, the pH of the solution was scarcely reduced with the passage of time. That is, the pH of a 1% aqueous aminodeoxykanamycin sulfate solution containing 2% glycerin prepared by dissolving 1 g. of aminodeoxykanamycin and 2 g. of glycerin in water to form 100 ml. of the solution was 6.7 immediately after the preparation thereof and when the solution was stored for one week at room temperature, the pH of the solution remained 6.7.

Moreover, when the above-mentioned polyhydric alcohol is incorporated in an aqueous solution of the basic watersoluble antibiotic, the anti-bacterial activity thereof is not degraded. For example, according to the inventors' experiments, the anti-bacterial activity of a 1% aminodeoxykanamycin sulfate containing 2% glycerin after preservation for 21 days at 60°C. was 100% of the activity of the solution immediately after the preparation thereof.

A better understanding of the present invention will be attained from the following examples, which are merely illustrative and not limitative of the present invention.

EXAMPLE 1

A mixture of 1 g. of fradiomycin sulfate and 2 g. of glycerin was dissolved in water to provide 100 ml. of the aqueous solution. For comparison, a 1% aqueous fradiomycin sulfate solution not containing glycerin was prepared.

Each of the 1% aqueous fradiomycin sulfate solution containing 2% glycerin and the 1% aqueous fradiomycin sulfate solution not containing glycerin (prepared above) was placed in a synthetic resin vessel and after the solution was stored for 21 days at 60°C., the absorbance of the solution at 450 m.$\mu$. showing the colored extent of the solution was measured. The results indicate that the absorbance of the 1% fradiomycin sulfate solution containing 2% glycerin was 0.077, while the absorbance of the 1% aqueous fradiomycin sulfate solution containing no glycerin was 0.198. Thus, the coloring of the 1% aqueous fradiomycin sulfate solution containing 2% glycerin according to the present invention was prevented.

EXAMPLE 2

A mixture of 1 g. of fradiomycin sulfate and 2 g. of propylene glycol was dissolved in water to provide 100 ml. of the solution and also, for comparison, a 1% aqueous fradiomycin sulfate solution containing no propylene glycol was prepared as a control sample.

When each of the 1% aqueous fradiomycin sulfate solution containing 2% propylene glycol and the 1% aqueous fradiomycin solution containing no propylene glycol (prepared above) was tested as in Example 1, the absorbance of the 1% aqueous fradiomycin sulfate solution containing 2% propylene glycol was 0.065, while the absorbance of the 1% aqueous fradiomycin sulfate solution containing no propylene glycol was 0.198. Thus, the coloring of the 1% aqueous fradiomycin sulfate solution containing 2% propylene glycol was prevented.

EXAMPLE 3

A mixture of 1 g. of fradiomycin sulfate and each of the polyhydric alcohols shown in Table 6 below, in the amount shown therein, was dissolved in water to provide 100 ml. of the aqueous solution. Also, for comparison, a 1% aqueous fradiomycin sulfate solution containing no polyhydric alcohol was prepared as a control sample.

When each of the 1% aqueous fradiomycin sulfate solution containing the polyhydric alcohol and the 1% aqueous fradiomycin sulfate solution containing no polyhydric alcohol (prepared above) was tested as in Example 1, the results shown in the following table were obtained. The results clearly establish that discoloration was prevented in the aqueous solutions of the antibiotic containing the polyhydric alcohols.

Table 6

| Additive and amount | | Absorbance at 450 m. μ |
|---|---|---|
| None (control) | | 0.198 |
| Glycerin | 5% | 0.079 |
| " | 10% | 0.080 |
| Propylene glycol | 5% | 0.059 |
| " | 10% | 0.061 |
| Ethylene glycol | 1% | 0.075 |
| Diethylene glycol | 1% | 0.074 |
| Triethylene glycol | 1% | 0.089 |
| Polyethylene glycol | 1% | 0.103 |
| " | 5% | 0.102 |
| " | 10% | 0.095 |
| Mannitol | 1% | 0.095 |

EXAMPLE 4

A mixture of 1 g. of streptomycin sulfate and 5 g. of glycerin was dissolved in water to provide 100 ml. of the aqueous solution and for comparison, a 1% aqueous streptomycin sulfate solution containing no glycerin was also prepared as a control sample.

When each of the 1% aqueous streptomycin sulfate solution containing 5% glycerin and 1% aqueous streptomycin sulfate solution containing no glycerin (prepared above) was tested as in Example 1, the absorbance of the 1% aqueous streptomycin sulfate solution containing 5% glycerin was 0.098, while the absorbance of the 1% aqueous streptomycin sulfate solution containing no glycerin was 0.183. Thus, the coloring of the 1% streptomycin sulfate solution containing 5% glycerin was prevented.

EXAMPLE 5

A mixture of 1 g. of streptomycin sulfate and each of the polyhydric alcohols shown in Table 7 were prepared, their concentrations being indicated therein. For comparison, a 1% aqueous streptomycin sulfate solution containing no polyhydric alcohol was prepared as a control sample.

When each of the 1% aqueous streptomycin sulfate solutions containing the polyhydric alcohol (prepared above) was tested as in Example 1, the results shown in the following table were obtained, which again indicate that coloring was prevented in the aqueous solutions of the antibiotic containing the polyhydric alcohols of this invention.

Table 7

| Additive and the amount | | Absorbance at 450 m. μ |
|---|---|---|
| None (control) | | 0.183 |
| Glycerin | 2% | 0.173 |
| Glycerin | 10% | 0.154 |
| Propylene glycol | 5% | 0.094 |
| Polyethylene glycol | 1% | 0.084 |
| Mannitol | 1% | 0.125 |

EXAMPLE 6

A mixture of 1 g. of kanamycin sulfate and 5 g. of glycerin was dissolved in water to provide 100 ml. of the aqueous solution. For comparison, a 1% aqueous kanamycin sulfate solution containing no glycerin was prepared as a control sample.

When each of the 1% aqueous kanamycin sulfate solution containing 5% glycerin and the 1% aqueous kanamycin sulfate solution containing no glycerin (prepared above) was tested as in Example 1, the absorbance of the 1% aqueous kanamycin sulfate solution containing 5% glycerin was 0.006, while the absorbance of the 1% aqueous kanamycin sulfate solution containing no glycerin prepared as a control sample was 0.063. The above results show that coloring of the 1% aqueous kanamycin sulfate solution containing 5% of glycerin was prevented.

EXAMPLE 7

A mixture of 1 g. of kanamycin sulfate and each of the various polyhydric alcohols shown in Table 8, in the amount shown therein, was dissolved in water to make 100 ml. of the aqueous solution. For comparison, a 1% aqueous kanamycin sulfate solution containing no polyhydric alcohol was prepared as a control sample.

When each of the 1% aqueous kanamycin sulfate solution containing the polyhydric alcohol and the 1% aqueous kanamycin sulfate solution containing no polyhydric alcohol was tested as in Example 1, the results shown in obtained, 8 were obtaianed, which demonstrate that the coloring of the aqueous solutions of the antibiotics containing the polyhydric alcohols was prevented.

Table 8

| Additive and the amount | | Absorbance at 450 m. μ |
|---|---|---|
| None (control) | | 0.063 |
| Glycerin | 2% | 0.012 |
| " | 10% | 0.010 |
| Propylene glycol | 2% | 0.006 |
| " | 5% | 0.011 |
| " | 10% | 0.008 |
| Ethylene glycol | 1% | 0.009 |
| Diethylene glycol | 1% | 0.023 |
| Mannitol | 5% | 0.015 |

EXAMPLE 8

A mixture of 1 g. of aminodeoxykanamycin sulfate and 2 g. of glycerin was dissolved in water to make 100 ml. of the aqueous solution and also for comparison, a 1% aqueous aminodeoxykanamycin sulfate solution containing no glycerin was prepared as a control sample.

When each of the 1% aqueous aminodeoxykanamycin sulfate solutions containing 2% glycerin and the 1% aqueous aminodeoxykanamycin sulfate solution containing no glycerin was tested as in Example 1, the absorbance of the 1% aqueous aminodeoxykanamycin sulfate solution containing 2% glycerin was 0.014, while the absorbance of the 1% aqueous solution containing no glycerin was 0.172. The results indicate that the coloring of the 1% aqueous aminodeoxykanamycin sulfate solution containing 2% glycerin was prevented.

EXAMPLE 9

A mixture of 1 g. of aminodeoxykanamycin sulfate and each of the various polyhydric alcohols shown in Table 9, in the amount shown therein, was dissolved in water to make 100 ml. of the aqueous solution and also for the comparison, a 1% aqueous aminodeoxykanamycin sulfate solution containing no polyhydric alcohol was prepared as a control sample.

When each of the 1% aqueous aminodeoxykanamycin sulfate solutions containing the polyhydric alcohol and the 1% aminodeoxykanamycin sulfate solution containing no polyhydric alcohol was tested as in Example 1, the results shown in Table 9 were obtained, which proved that the coloring of the aqueous solutions of the antibiotic containing the polyhydric alcohols was prevented.

Table 9

| Additive and the amount | | Absorbance at 450 m.μ |
|---|---|---|
| None (control) | | 0.172 |
| Glycerin | 5% | 0.013 |
| " | 10% | 0.011 |
| Propylene glycol | 2% | 0.025 |
| " | 5% | 0.026 |
| " | 10% | 0.024 |
| Polyethylene glycol | 1% | 0.106 |
| " | 5% | 0.104 |
| Mannitol | 1% | 0.044 |
| " | 5% | 0.019 |
| Ethylene glycol | 1% | 0.087 |
| Diethylene glycol | 1% | 0.061 |
| Triethylene glycol | 1% | 0.072 |

Although the present invention has adequately and extensively been discussed in the foregoing disclosure and examples included therein, it is readily apparent that various changes and modifications can be made without departing from the spirit and scope thereof.

What is claimed is:

1. An aqueous antibiotic composition consisting essentially of an antibiotic effective amount of aminodeoxykanamycin, 1 – 10% of glycerine with the balance of the aqueous composition being water.

2. An aqueous antibiotic composition consisting essentially of an antibiotic effective amount of aminodeoxykanamycin, 1 – 10% of propylene glycol, with the balance of the aqueous composition being water.

3. An aqueous antibiotic composition consisting essentially of an antibiotic effective amount of aminodeoxykanamycin, 1 – 10% of polyethylene glycol, with the balance of the aqueous composition being water.

4. An aqueous antibiotic composition consisting essentially of an antibiotic effective amount of aminodeoxykanamycin, 1 – 10% of mannitol, with the balance of the aqueous composition being water.

* * * * *